US011261028B2

(12) United States Patent
Cheevers

(10) Patent No.: US 11,261,028 B2
(45) Date of Patent: Mar. 1, 2022

(54) WEAR LINERS

(71) Applicant: International Materials & Technology Pty Limited, New South Wales (AU)

(72) Inventor: Scott Cheevers, New South Wales (AU)

(73) Assignee: International Materials & Technology Pty Limited, New South Wales (AU)

( * ) Notice: Subject to any disclaimer, the term of this patent is extended or adjusted under 35 U.S.C. 154(b) by 233 days.

(21) Appl. No.: 16/632,929

(22) PCT Filed: Jul. 13, 2018

(86) PCT No.: PCT/AU2018/050722
§ 371 (c)(1),
(2) Date: Jan. 22, 2020

(87) PCT Pub. No.: WO2019/018883
PCT Pub. Date: Jan. 31, 2019

(65) Prior Publication Data
US 2021/0362955 A1    Nov. 25, 2021

(30) Foreign Application Priority Data
Jul. 26, 2017  (AU) .................................. 2017902924

(51) Int. Cl.
*B65G 11/16* (2006.01)
(52) U.S. Cl.
CPC .... *B65G 11/166* (2013.01); *B65G 2203/0275* (2013.01); *B65G 2207/48* (2013.01)
(58) Field of Classification Search
CPC .................................................. B65G 11/166
See application file for complete search history.

(56) References Cited

U.S. PATENT DOCUMENTS

| 8,739,938 B2* | 6/2014 | King | F16D 66/027 |
| | | | 188/1.11 L |
| 2011/0085883 A1* | 4/2011 | Swinderman | B65G 11/166 |
| | | | 414/800 |

FOREIGN PATENT DOCUMENTS

| AU | 2010202589 A1 * | 1/2011 | ............. B65G 11/00 |
| EP | 1199491 A1 * | 4/2002 | ............. F16D 66/02 |

(Continued)

OTHER PUBLICATIONS

International Search Report issued by ISA/AU in connection with PCT/AU2018/050722 dated Oct. 16, 2018.

(Continued)

*Primary Examiner* — William R Harp
(74) *Attorney, Agent, or Firm* — Levenfeld Pearlstein, LLC

(57) ABSTRACT

The present invention relates broadly to a wear liner module (10) for equipment in a high wear environment, said module (10) comprising a back plate (12) and a wear liner (11) including one or more tiles (14a) to (14f) formed of wear resistant material, and one or more sensors such as (16a) mounted to the wear resistant tile such as (14a). The wear sensor (16a) is mounted to a perimeter face of the corresponding wear resistant tile (14a). The wear sensor (16a) is electrically coupled to a microprocessor mounted to a rear face of the tile (14a). The microprocessor is configured to process data received from the wear sensor (16a) to provide a wear signal represented of wear in the wear sensor (16a). The microprocessor (24a) transmits the wear signal to a wireless receiver (34a) mounted to the backing plate (12).

20 Claims, 5 Drawing Sheets

(56) References Cited

FOREIGN PATENT DOCUMENTS

EP        2955132 A1    12/2015
WO     2012122587 A1     9/2012

OTHER PUBLICATIONS

Written Opinion issued by ISA/AU in connection with PCT/AU2018/050722 dated Oct. 16, 2018.
International Preliminary Report on Patentability issued by ISA/AU in connection with PCT/AU2018/050722 dated Sep. 24, 2019.
Written Opinion issued by ISA/AU in connection with PCT/AU2018/050722 dated Jun. 21, 2019.

* cited by examiner

WEAR LINERS

This is a National Stage Application of International Patent Application No. PCT/AU2018/050722, filed 13 Jul. 2018, which claims the benefit of and priority to Australian (AU) Patent Application No. 2017902924, filed 26 Jul. 2017, the entireties of which are incorporated fully herein by reference.

TECHNICAL FIELD

The present invention relates broadly to wear liners, typically for use on equipment in a high wear environment. The invention also relates broadly to a method of manufacturing or installing a wear liner.

BACKGROUND OF INVENTION

For equipment in high wear applications it is known to provide wear liners designed to handle wear associated with highly abrasive materials, such as iron ore or coal. The wear liners include tiles constructed of a wear resistant material, for example alumina ceramic tiles. Traditionally wear in the tiles is detected visually or by using handheld ultrasonic measuring devices, requiring shutdown of the equipment in which the wear liners are installed. This shutdown is an expensive exercise as the associated downtime for replacement of worn tiles is significant resulting in lost production.

In an attempt to address this expense in inspecting and maintaining wear liners in bulk material chutes several solutions are offered which provide in-situ real time monitoring of wear in wear liners. These solutions include installation of one or more wear sensor probes into wear liners with the sensor probe passing through a hole formed in the wear tile. The wear sensors are fitted flush with a wear surface of the wear tile and exposed to bulk material entering the chute. In use, the wear sensor thus wears in conjunction with the wear tile to provide an indication of wear in that particular tile. Although this solution is effective in providing real time monitoring of wear in the wear liners it suffers from at least the following drawbacks:

i) the wear sensor probes are relatively expensive to manufacture and install;

ii) installation of the wear sensor probes through the wear liner and the ceramic wear tile compromises the integrity of the wear liner;

iii) wear across the wear liners is at a relatively low resolution as coverage across the chute is limited.

SUMMARY OF INVENTION

According to a first aspect of the present invention there is provided a wear liner comprising:

one or more tiles formed of a wear resistant material;

one or more wear sensors mounted to a perimeter face of at least one of the wear resistant tiles whereby a predetermined amount of wear on an exposed surface of said at least one of the wear resistant tiles provides wear on said one or more wear sensors mounted to said at least one of the tiles, said wear on said one or more wear sensors being indicative of wear on the exposed surface of said at least one of said tiles.

Preferably the wear resistant tiles are arranged in a single layer on a backing plate for substantially complete coverage of said backing plate to form a wear liner module. More preferably the wear liner module is one of a plurality of said modules adapted to be fitted to a chute for substantially complete coverage of the chute. Alternatively the wear resistant tiles are arranged in a single layer on a surface of equipment associated with abrasive material handling or transfer.

Preferably the wear sensor is an inductive wear sensor including an inductive coil loop mounted directly to the perimeter face of the corresponding wear resistant tile to which the wear sensor is mounted. More preferably the inductive coil loop is one of a plurality of discrete tracks each located directly on the perimeter face at or proximal predetermined edge regions of the wear resistant tile to provide an indication of wear in the exposed surface at or proximal said edge region of the wear resistant tile based on wear in the corresponding track.

Preferably the wear liner also comprises an intermediate layer sandwiched between the single layer of said one or more wear resistant tiles and the backing plate or the surface of the equipment on which it is arranged. More preferably the intermediate layer is a rubber or resinous layer to which the wear resistant tiles are vulcanised or adhered.

Preferably the wear liner module further comprises a microprocessor associated with at least one of the wear sensors, said microprocessor configured to process data received from said sensors to provide a wear signal representative of wear in the wear sensor and thus wear on the exposed surface of the wear resistant tile to which the wear sensor is mounted. More preferably the microprocessor is coupled to a transponder associated with the wear resistant tile and arranged to transmit the wear signal to a wireless receiver mounted to the backing plate or the surface of the equipment on which it is arranged. Alternatively the microprocessor is associated with the backing plate, or the surface of the equipment on which it is arranged, and designed to receive wear data directly from the corresponding wear sensor.

Preferably the backing plate is adapted to secure internally of a chute. More preferably the backing plate is in the form of a steel pad detachably secured internally of a wall of the chute. Alternatively the wear tiles are mounted to the surface of the equipment associated with abrasive material handling or transfer, said equipment including but not limited to pipes, pumps, ball mills, or other equipment in a high wear environment.

According to a second aspect of the invention there is provided a method of manufacturing or installing a wear liner, said method comprising the steps of:

mounting one or more wear sensors to a perimeter face of a tile formed of a wear resistant material;

mounting one or more of the wear resistant tiles to a backing plate or a surface of equipment associated with abrasive material handling or transfer whereby a predetermined amount of wear on an exposed surface of at least one of the wear resistant tiles provides wear on said one or more wear sensors mounted to said at least one of the tiles, said wear on said one or more wear sensor being indicative of wear on the exposed surface of said at least one of said tiles.

Preferably the method also comprises the step of sandwiching an intermediate layer between the wear resistant tile and the backing plate or the surface of the equipment on which it is mounted. More preferably the intermediate layer is a rubber layer designed to be vulcanised to the wear resistant tile. Alternatively the intermediate layer is a resinous layer designed to be applied between the backing plate, or the surface of the equipment on which it is mounted, and the wear resistant tile.

BRIEF DESCRIPTION OF DRAWINGS

In order to achieve a better understanding of the nature of the present invention a preferred embodiment of a wear liner will now be described, by way of example only, with reference to the accompany drawings in which.

DETAILED DESCRIPTION

Figure 1:
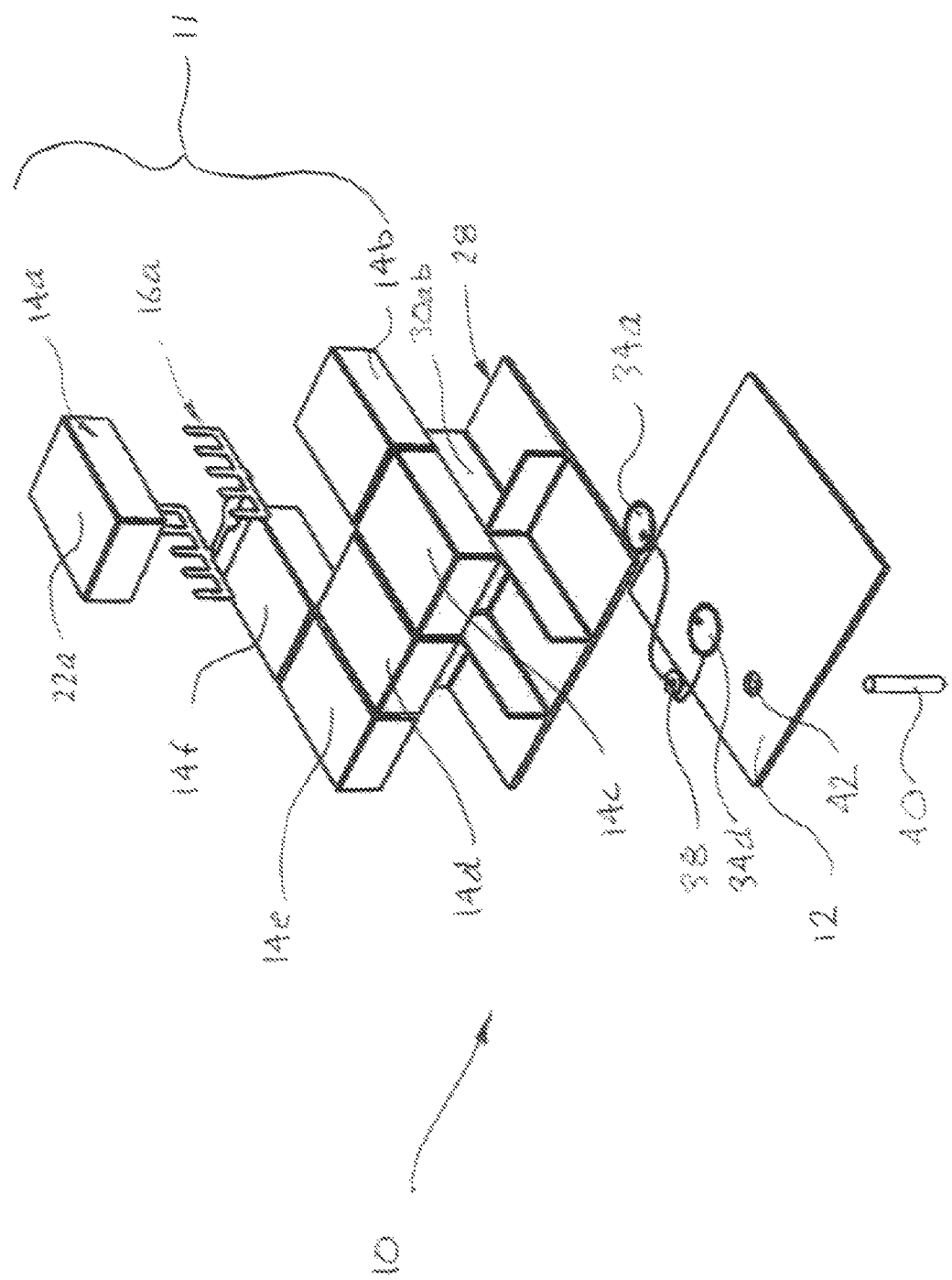
FIG. 1 is an exploded perspective view of a wear liner module including a wear liner according to one embodiment of the invention.

As seen in FIG. 1 there is one embodiment of a wear liner module 10 for equipment in a high wear environment, such as a bulk materials chute (not illustrated). The wear liner module 10 is shown in exploded detail and generally comprises a backing plate 12 to which a wear liner 11 is mounted. The wear liner 11 of this example includes one or more tiles such as 14a to 14f formed of a wear resistant material, and one or more sensors such as 16a mounted to the wear resistant tile such as 14a. The backing plate 12 is in this example in the form of a steel pad detachably secured internally of a wall of the chute. The wear resistant tiles such as 14a are mounted to the steel pad 12 in a single layer for substantially complete coverage of the steel pad 12.

Figure 2:
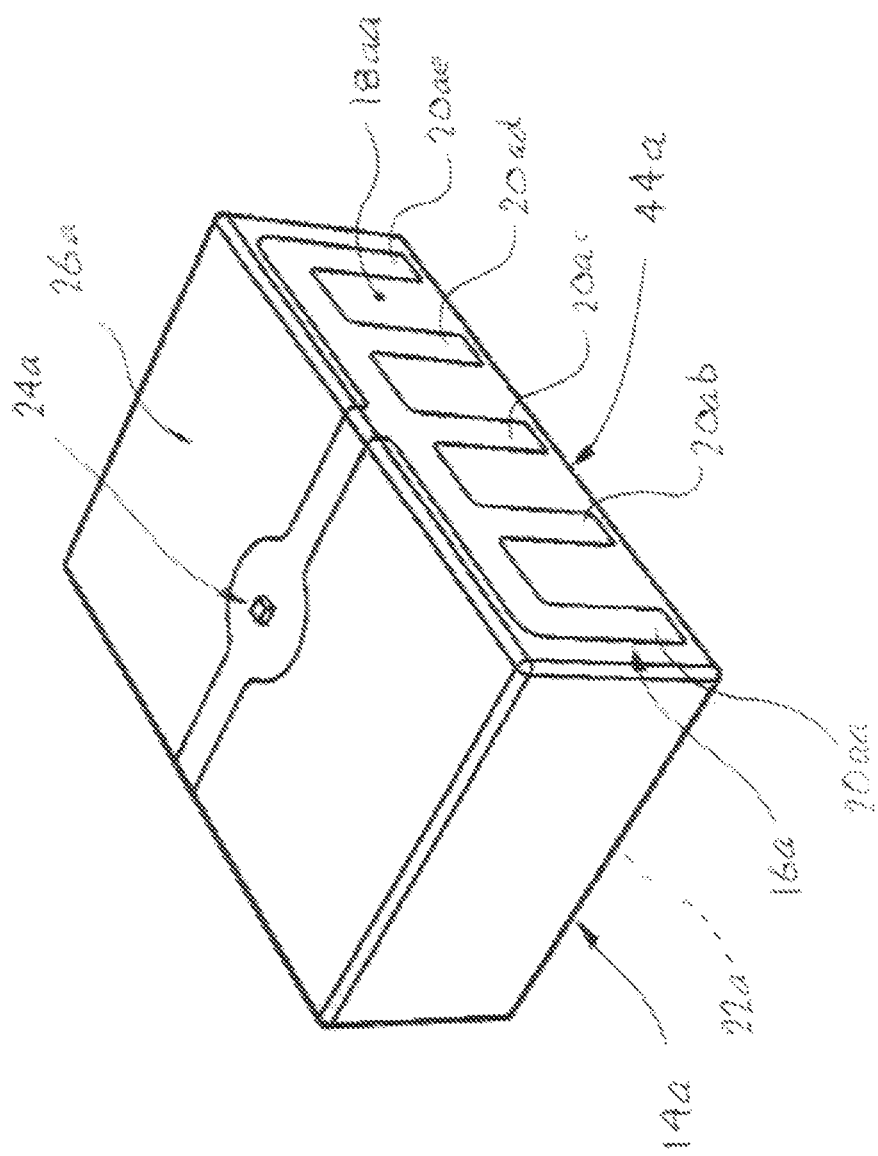
FIG. 2 is an enlarged perspective view of one of the wear resistant tiles together with its wear sensor taken from the wear liner module of FIG. 1.

As best illustrated in FIG. 2 the wear sensor such as 16a is mounted to a perimeter face such as 18aa of the corresponding wear resistant tile 14a. In this embodiment the wear sensor 16a is an inductive wear sensor including a plurality of tracks 20aa to 20ae adhered to the perimeter face 18aa of the wear resistant tile 14a. The wear resistant tile 14a of this example includes five discrete tracks such as 20aa to 20ae located on each of its opposing perimeter faces such as 18aa. Each of the tracks such as 20aa is in the form of a finger extending toward an exposed surface such as 22a of the wear resistant tile 14a. The ten (10) finger like tracks 20aa to 20aj are together electrically coupled to a microprocessor 24a mounted to a rear face 26a of the tile 14a.

As seen in FIG. 1 the wear liner module 10 of this embodiment includes an intermediate layer 28 sandwiched between the single layer of wear resistant tiles 14a to 14f and the steel pad 12. The intermediate layer 28 is in the form of a rubber layer which is vulcanised to the steel pad 12 and the wear resistant tiles 14a to 14f. In this example the vulcanised rubber of the intermediate layer 28 extends between adjacent of the wear resistant tiles such as 14a and 14b in the form of dividing wall 30ab. The dividing wall such as 30ab assists in mounting of the wear sensor 16a to the wear resistant tile 14a.

In this embodiment the microprocessor 24a is in the form of a microcontroller configured to process data received from each of the discrete finger like tracks 20aa to 20aj to provide a wear signal representative of wear in the wear sensor such as 16a. The microcontroller such as 24a of this embodiment is associated with a transponder or chip (not designated) arranged to transmit the wear signal to a wireless receiver such as 34a mounted to the steel pad 12. In this example the wear signal is wirelessly transmitted from the transponder chip to the wireless receiver such as 34a in the form of an RFID signal. In an alternative embodiment the wear sensor 16a is inductively coupled to an inductive coupling associated with the backing plate 12 or other element of the chute. In this case the wear signal representative of wear in the wear sensor 16a is transmitted from an inductive coupling associated with the wear sensor 16a to the inductive coupling of the backing plate 12.

In this embodiment the wear liner module 10 includes another of the wear sensors (not seen) dedicated to another of the wear resistant tiles 14d. The other wear sensor is of a substantially identical construction to the wear sensor 16a dedicated to the wear resistant tile 14a. The other wear sensor includes its dedicated microprocessor or microcontroller which wirelessly communicates the relevant wear signal from another transponder associated with the wear resistant tile 14d to another wireless receiver 34d. The pair of wireless receivers 34a and 34d of this embodiment are sandwiched between the rubber intermediate layer 28 and the steel backing pad 12. The wireless receivers 34a/d are wired to a common identification plug 38 which:

1. uniquely identifies the wear liner module 10 with a unique identifier;
2. collates the wear signals from in this case the wear sensors 16a/d for communication outside the chute.

The wireless receiver such as 34a/d and any associated electronics are powered via a battery 40. The battery 40 in this example is electrically coupled to the liner ID plug 38 via a cartridge which passes from outside the chute through the steel pad 12 via aperture 42.

Figure 3:
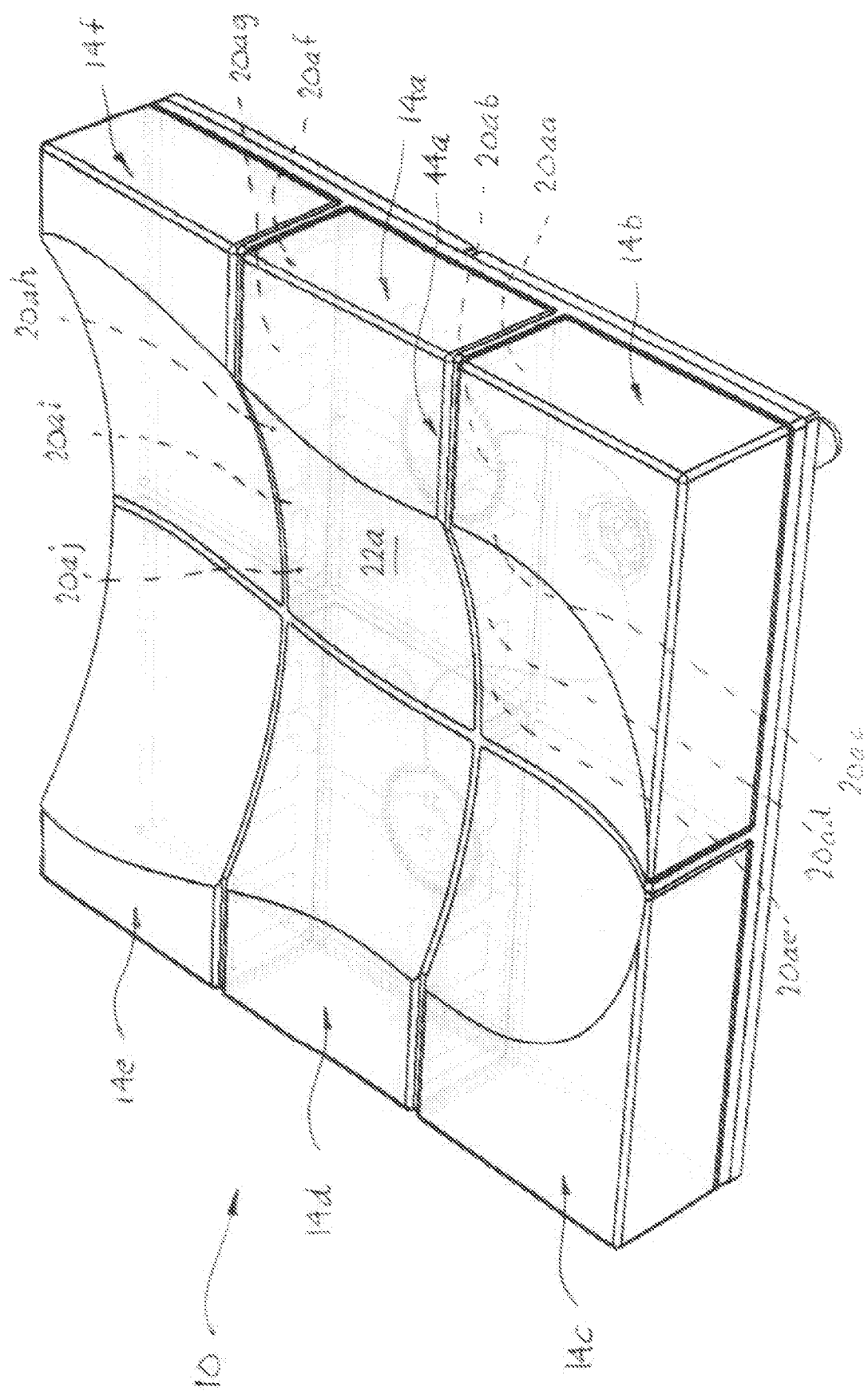
FIG. 3 is a perspective view of the wear liner module of the preceding embodiment schematically depicting wear in its wear resistant tiles.

In operation and as seen in FIG. 3, it will be understood that wear on the exposed surface such as 22a of the wear resistant tile 14a will in this embodiment expose one or more of the plurality of tracks such as 20ac to 20ae of the wear sensor 16a. The tracks such as 20aa to 20ae are located proximal predetermined edge regions or in this case equally spaced around a perimeter edge such as 44a of the wear resistant tile 14a. Therefore, wear at the exposed face 22a of the wear resistant tile 14a adjacent its perimeter edge 44a will also wear one or more of the tracks 20a c to 20a e. This corresponding wear in the tracks such as 20ac to 20ae is thus indicative of the wear in the exposed face 22a of the tile 14a. This indicative wear in the wear resistant tile 14a can be associated with the particular track such as 20ac to 20ae in which the corresponding wear is detected.

This means that wear in the wear resistant tile 14a can be accurately detected at a relatively high resolution based in this example on the ten (10) tracks 20aa to 20aj associated with the wear resistant tile 14a. It will be understood that wear in the adjacent wear resistant tile such as 14b can also be detected by the corresponding wear in at least the tracks 20aa to 20ae of the adjacent wear sensor 16a. Therefore, in this configuration of the wear liner module 10 it is possible to detect wear in all six wear resistant tiles 14a to 14f based on the two wear sensors 16a/d only.

Figure 4:
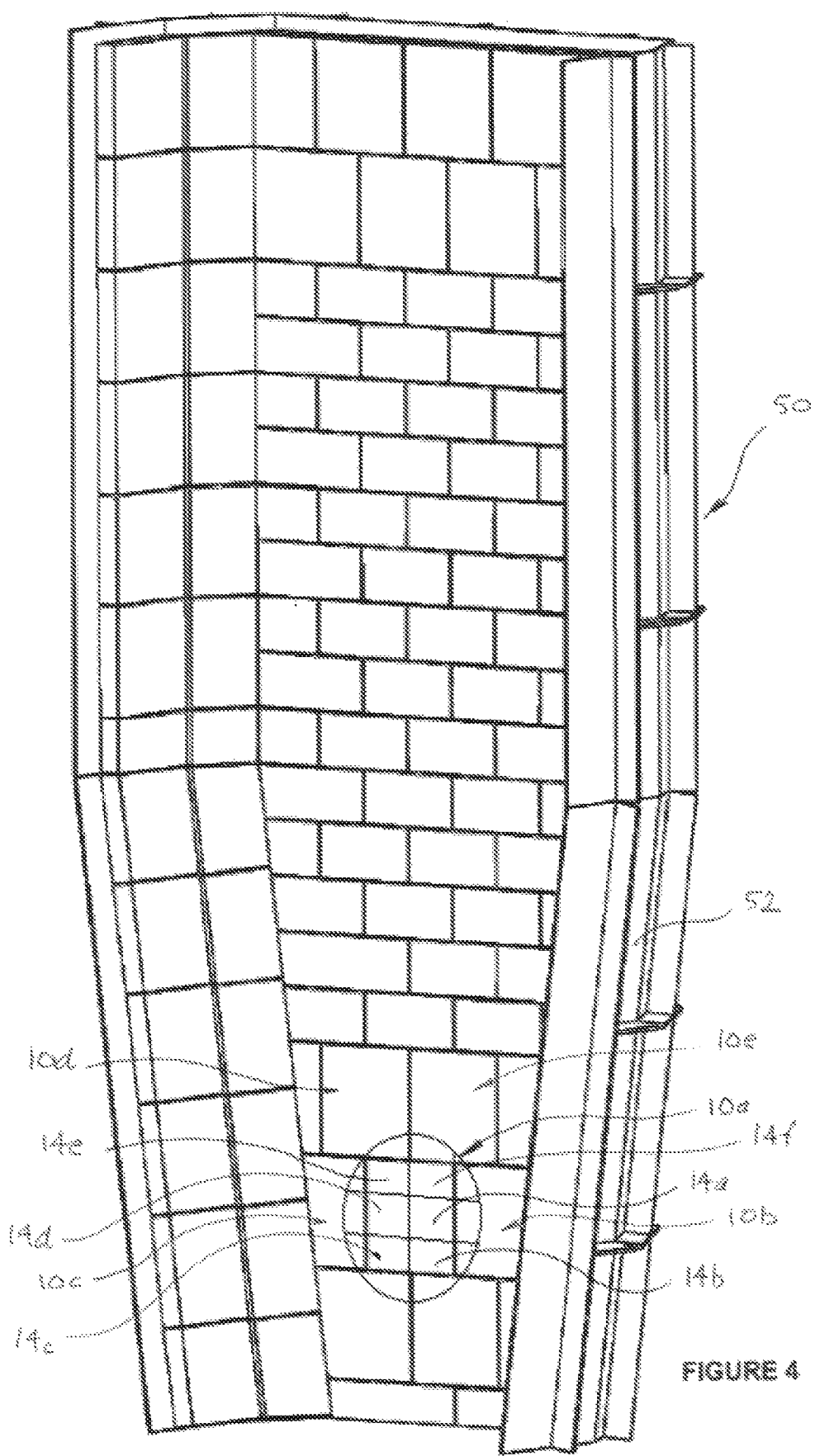
FIG. 4 is a perspective view shown in cutaway of a chute including one or more of the wear liner modules such as the module of FIG. 1.
Figure 5:
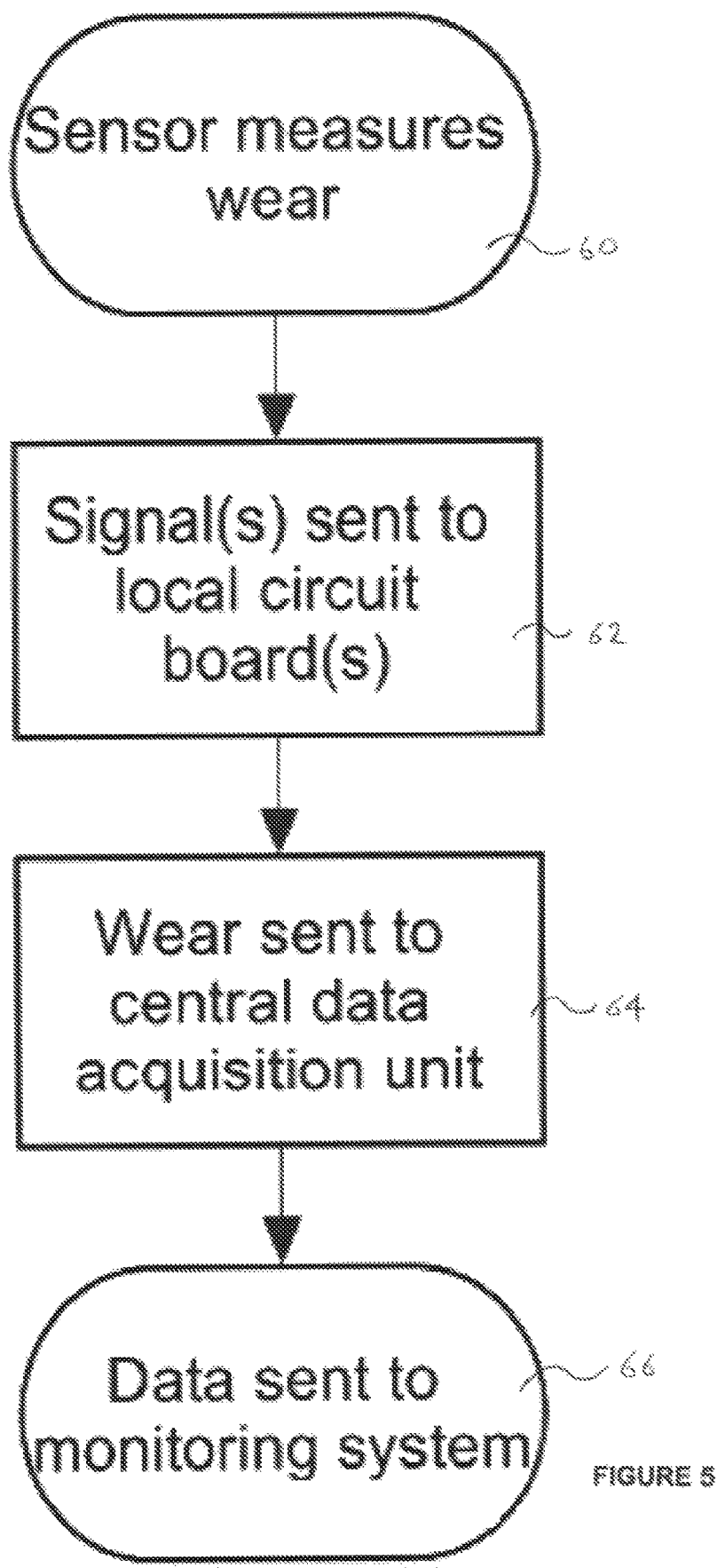
FIG. 5 is a block flow diagram illustrating data communication from the wear liner module such as the module of the embodiment of FIG. 1.

As seen in FIG. 4 the wear liner module 10a to 10d is one of a series of modules fitted internally of the chute 50. The wear liner modules such as 10a provide substantially complete coverage of the internal wall 52 of the chute 50. The chute 50 is likely to be associated with a locally mounted circuit board (not shown) arranged to communicate with each of the wear liner modules such as 10a. FIG. 5 otherwise illustrates the generally steps involved in communicating wear data associated with the chute such as 50 to a remote data acquisition monitoring system where at:

1. step 60, wear data for each of the wear liner modules such as 10 is detected;

2. step 62, the wear data or the derived wear signal is retrieved at the circuit board local to the chute such as 50;
3. step 64, the wear data from the chute 50 and other chutes from which wear data is gathered is sent remotely via a predetermined wireless protocol in a mesh network to a data acquisition unit such as an industrial PC or other microprocessor assembly;
4. step 66, the wear data is monitored for the purposes of process control or maintenance.

In an alternative embodiment the wear liner such as 11 may be mounted or otherwise associated with a surface of equipment used in abrasive material handling or transfer equipment. In this case there will be no wear liner module as such and the wear liner is applied directly to the surface of the equipment, without a backing plate or the like, possibly with an intermediate layer such as a rubber or resinous layer. The type of equipment suited to this embodiment includes but is not limited to pipes, pumps, ball mills, or other equipment in a high wear environment.

In another aspect of the invention there is provided a method of manufacturing a wear liner module such as the module 10 of the preceding embodiment. The general steps involved in manufacture of the wear liner module such as 10 are as follows:
1. one or more wear sensors such as 16a or 16d are mounted to a perimeter face of respective tiles such as 14a or 14d formed of a wear resistant material;
2. a plurality of the wear resistant tiles such as 14a to 14f together with the wear sensor 16a/d are mounted to a backing plate such as 12.

Preferably an intermediate layer such as the rubber layer 28 is sandwiched between the single layer of wear resistant tiles 14a and 14f and the backing plate 12. This step typically involves a vulcanisation process where in this example:
1. the wear sensors such as 16a and 16d are held in place via the vulcanised intermediate rubber layer 28 together with the associated dividing walls such as 30a/b;
2. the wireless receivers 34a and 34d together with associated electronics are effectively mounted to the backing plate 12 via the vulcanised rubber layer 28.

In an alternative embodiment the wear liner 11 is installed on the surface of the abrasive material handling or transfer equipment (not shown) without a backing plate or the like. This may involve directly vulcanising or otherwise adhering or securing the wear liner 11 or discrete wear tiles such as 14a to the surface for substantially complete coverage of the surface.

Now that a preferred embodiment of a wear liner has been described it will be apparent to those skilled in the art that it has the following advantages:
1. the wear liner provides relatively high resolution detection of wear in the associated tiles;
2. the wear sensors are located within the wear liner without influencing the shape or compromising the integrity of the associated tiles;
3. the wear sensors can be of a relatively low cost;
4. the wear liner can be manufactured without significant departure from or disruption of conventional techniques for manufacturing traditional wear liners;
5. the wear liner and the associated modules have the capability to provide wear data in real time allowing effective process control to influence wear within a chute or other wear environment;
6. the wear liner allows for the monitoring of wear within chutes or other equipment used in abrasive material handling or transfer equipment without needing to shutdown associated plant.

Those skilled in the art will appreciate that the invention as described herein is susceptible to variations and modifications other than those specifically described. For example, the wear sensor need not be of the inductive track configuration of the preferred embodiment but rather extends to other sensors which can be mounted to a perimeter face of the associated tile such as resistive or capacitive sensors. The wear sensor may also depart from the preferred embodiment insofar as it may be wired to a microcontroller at or outside the backing plate, or other equipment used in abrasive material handling or transfer equipment, rather than relying on the wireless communication of the preferred embodiment. The rubber intermediate layer may be replaced with a resinous layer applied between the backing plate, or the surface of other equipment used in abrasive material handling or transfer equipment, and the wear resistant tiles. All such variations and modifications are to be considered within the scope of the present invention the nature of which is to be determined from the foregoing description.

The invention claimed is:

1. A wear liner comprising:
one or more tiles formed of a wear resistant material;
a wear sensor including a plurality of discrete tracks mounted directly to a perimeter face of at least one of the wear resistant tiles, said discrete tracks being mounted proximal predetermined edge regions of said tile whereby a predetermined amount of wear on an exposed surface of said wear resistant tile provides wear on said one or more of the plurality of discrete tracks, said wear being indicative of wear on the exposed surface of said tile at or proximal said edge region of the wear resistant tile based on wear in said one or more tracks.

2. A wear liner as claimed in claim 1 also comprising an inductive coupling associated with the wear sensor for transmitting a wear signal representative of wear in the plurality of discrete tracks from the wear sensor.

3. A wear liner as claimed in claim 1 wherein the plurality of discrete tracks of the wear sensor include inductive wear tracks adhered directly to the perimeter face of the tile.

4. A wear liner assembly comprising:
one or more tiles formed of a wear resistant material;
a wear sensor including a plurality of discrete tracks mounted directly to a perimeter face of at least one of the wear resistant tiles, said discrete tracks being mounted proximal predetermined edge regions of said tile;
a backing plate or surface of equipment associated with abrasive material handling or transfer, said wear resistant tiles arranged in a single layer on the backing plate or said surface whereby a predetermined amount of wear on an exposed surface of said wear resistant tile provides wear on said one or more of the plurality of discrete tracks, said wear being indicative of wear on the exposed surface of said tile at or proximal said edge region of the wear resistant tile based on wear in said one or more tracks.

5. A wear liner assembly as claimed claim 4 also comprising an intermediate layer sandwiched between the single layer of said one or more wear resistant tiles and the backing plate or the surface of the equipment on which it is arranged.

6. A wear liner assembly as claimed in claim 4 further comprising a microprocessor associated with at least one of the wear sensors, said microprocessor configured to process data received from said sensors to provide a wear signal representative of wear in the plurality of discrete tracks of the wear sensor and thus wear on the exposed surface of the wear resistant tile to which the wear sensor is directly mounted.

7. A wear liner assembly as claimed in claim 6 wherein the microprocessor is coupled to a transponder arranged to transmit the wear signal to a wireless receiver mounted to the backing plate or the surface of the equipment on which it is arranged.

8. A wear liner assembly as claimed in claim 4 also comprising a microprocessor associated with the backing plate, or the surface of the equipment on which it is arranged, and designed to receive wear data directly from the corresponding wear sensor.

9. A wear liner assembly as claimed in claim 4 wherein the wear resistant tiles are arranged for substantially complete coverage of said plate to form a wear liner module.

10. A wear liner assembly as claimed in claim 9 wherein the wear liner module is one of a plurality of said modules adapted to be fitted to a chute for substantially complete coverage of the chute.

11. A wear liner assembly as claimed in claim 10 wherein the backing plate is adapted to secure internally of the chute.

12. A wear liner assembly as claimed in claim 11 wherein the backing plate is in the form of a steel pad detachably secured internally of a wall of the chute.

13. A wear liner assembly as claimed in claim 4 wherein the wear tiles are mounted to the surface of the equipment associated with abrasive material handling or transfer, said equipment including but not limited to pipes, pumps, ball mills, or other equipment in a high wear environment.

14. A wear liner assembly comprising:
   one or more tiles formed of a wear resistant material;
   a wear sensor including a plurality of discrete tracks mounted directly to a perimeter face of at least one of the wear resistant tiles;
   an inductive coupling associated with the wear sensor for transmitting a wear signal representative of wear in said wear sensor;
   a backing plate or surface of equipment associated with abrasive material handling or transfer, said one or more tiles arranged in a single layer across the backing plate or said surface;
   an intermediate layer located between the single layer of said one or more tiles and the backing plate or said surface;
   an inductive coupling associated with the backing plate or said surface, said inductive coupling arranged for inductive coupling with the sensor inductive coupling for receipt of the wear signal from the sensor inductive coupling via the intermediate layer whereby a predetermined amount of wear on an exposed surface of said at least one of the tiles provides wear on said one or more of the plurality of discrete tracks of said wear sensor, said sensor wear being indicative of wear on the exposed surface of said tile based on said wear in said one or more tracks.

15. A wear liner assembly as claimed in claim 14 wherein the plurality of discrete tracks are mounted proximal predetermined each regions of said tile whereby wear on said tracks is indicative of wear on the exposed surface of said tile at or proximal said edge region of the wear resistant tile based on wear in said one or more tracks.

16. A wear liner assembly as claimed in claim 14 wherein the wear resistant tiles are arranged for substantially complete coverage of said plate to form a wear liner module.

17. A wear liner assembly as claimed in claim 16 wherein the wear liner module is one of a plurality of said modules adapted to be fitted to a chute for substantially complete coverage of the chute.

18. A wear liner assembly as claimed in claim 17 wherein the backing plate is adapted to secure internally of the chute.

19. A wear liner assembly as claimed in claim 18 wherein the backing plate is in the form of a steel pad detachably secured internally of a wall of the chute.

20. A wear liner assembly as claimed in claim 16 wherein the wear tiles are mounted to the surface of the equipment associated with abrasive material handling or transfer, said equipment including but not limited to pipes, pumps, ball mills, or other equipment in a high wear environment.

* * * * *